(12) United States Patent
Hikone et al.

(10) Patent No.: US 11,506,432 B2
(45) Date of Patent: Nov. 22, 2022

(54) COLD WATER SUPPLY SYSTEM

(71) Applicant: Mitsubishi Electric Corporation, Tokyo (JP)

(72) Inventors: Takahito Hikone, Tokyo (JP); Yasushi Okoshi, Tokyo (JP); Takuya Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 17 days.

(21) Appl. No.: 17/256,625

(22) PCT Filed: Aug. 17, 2018

(86) PCT No.: PCT/JP2018/030531
§ 371 (c)(1),
(2) Date: Dec. 28, 2020

(87) PCT Pub. No.: WO2020/035940
PCT Pub. Date: Feb. 20, 2020

(65) Prior Publication Data
US 2021/0262714 A1    Aug. 26, 2021

(51) Int. Cl.
*F25B 41/40* (2021.01)
*F25B 7/00* (2006.01)

(52) U.S. Cl.
CPC ............... *F25B 41/40* (2021.01); *F25B 7/00* (2013.01)

(58) Field of Classification Search
CPC .......... F25B 41/40; F25B 41/42; F25B 41/45; F25B 41/48; F25B 7/00; F25B 2313/003;
(Continued)

(56) References Cited

FOREIGN PATENT DOCUMENTS

JP    2009063190 A  *  3/2009
JP    2012-145245 A     8/2012
(Continued)

OTHER PUBLICATIONS

English Translation of Yamada et al. (JP 2012145245 A) (Year: 2012).*

(Continued)

*Primary Examiner* — Miguel A Diaz
(74) *Attorney, Agent, or Firm* — Posz Law Group, PLC (57) ABSTRACT

A cold water supply system cools water flowing through a water pipe, and supplies the water cooled to a cooling load, the cold water supply system including: an independent refrigerant circuit unit including a first compressor and a first water heat exchanger configured to exchange heat between refrigerant and the water to cool the water; a composite unit configured to cool the water, and a controller configured to control operation of the independent refrigerant circuit unit and operation of the composite unit, wherein the composite unit includes a free cooling unit including a pump and a second water heat exchanger configured to exchange heat between a heat medium and the water to cool the water, and a coupled refrigerant circuit unit including a second compressor and a third water heat exchanger configured to exchange heat between refrigerant and the water to cool the water, and the controller controls an operating frequency of the first compressor, an operating frequency of the second compressor, and an operating frequency of the pump based on a temperature of the water flowing out from the water pipe.

13 Claims, 6 Drawing Sheets

(58) Field of Classification Search
CPC ........ F25B 2313/004; F25B 2313/0233; F25B 2313/0234; F25B 2313/0253; F25B 2313/0254; F25B 2339/046; F25B 2339/047; F25B 5/00–04; F25B 6/00–04
See application file for complete search history.

(56) References Cited

FOREIGN PATENT DOCUMENTS

| | | | |
|---|---|---|---|
| JP | 2013119989 A | | 6/2013 |
| JP | 2013122373 A | | 6/2013 |
| JP | 2014-214954 A | | 11/2014 |
| JP | 5677099 B2 | * | 2/2015 |
| JP | 2016194386 A | | 11/2016 |
| JP | 2017138025 A | | 8/2017 |
| JP | 2020183817 A | * | 11/2020 |

OTHER PUBLICATIONS

International Search Report of the International Searching Authority dated Nov. 6, 2018 for the corresponding International application No. PCT/JP2018/030531 (and English translation).
Extended European Search Report dated Jul. 14, 2021, issued in corresponding European Patent Application No. 18930461.1.
Office Action dated Aug. 3, 2021, issued in corresponding JP Patent Application No. 2020-537343 (and English Machine Translation).

* cited by examiner

COLD WATER SUPPLY SYSTEM

CROSS REFERENCE TO RELATED APPLICATION

This application is a U.S. national stage application of PCT/JP2018/030531 filed on Aug. 17, 2018, the contents of which are incorporated herein by reference.

TECHNICAL FIELD

The present disclosure relates to a cold water supply system that supplies cold water to be used in a factory or other facility.

BACKGROUND ART

Conventionally, a free cooling system is used in a location having a cooling load even in the winter season, such as a factory where a cooling process is performed or a data center where cooling is performed. For example, Patent Literature 1 discloses a free cooling system where a refrigerant circuit and a free cooling circuit are mounted on one free cooling unit.

In this free cooling system, an air heat exchanger for refrigerant circuit and an air heat exchanger for free cooling circuit are integrally arranged side by side. The unit is provided with an air-sending fen shared by two circuits. When this air-sending fen is driven, outdoor air is supplied to the respective air heat exchangers.

CITATION LIST

Patent Literature

Patent Literature 1: Japanese Unexamined Patent Application Publication No. 2013-119989

SUMMARY OF INVENTION

Technical Problem

However, in the free cooling unit disclosed in Patent Literature 1, the air heat exchanger for refrigerant circuit and the air heat exchanger for free cooling circuit are integrally arranged and hence, it is difficult to perform an independent load control on each circuit. Particularly, the air-sending fen is shared by the respective air heat exchangers and hence, when the refrigerant circuit and the free cooling circuit are operated simultaneously, it is difficult to appropriately control the respective circuits according to the operation states of the respective circuits.

The present disclosure has been made in view of the above-mentioned problem, and it is an object of the present disclosure to provide a cold water supply system that can appropriately control a refrigerant circuit and a free cooling circuit even in the case where the respective circuits are operated simultaneously.

Solution to Problem

A cold water supply system of an embodiment of the present disclosure is a cold water supply system that cools water flowing through a water pipe, and supplies the water cooled to a cooling load, the cold water supply system including: an independent refrigerant circuit unit including a first compressor and a first water heat exchanger configured to exchange heat between refrigerant and water flowing through the water pipe to cool the water; a composite unit configured to cool the water flowing through the water pipe; and a controller configured to control operation of the independent refrigerant circuit unit and operation of the composite unit, wherein the composite unit includes a free cooling unit including a pump and a second water heat exchanger configured to exchange heat between a heat medium and the water to cool the water, and a coupled refrigerant circuit unit including a second compressor and a third water heat exchanger configured to exchange heat between refrigerant and the water to cool the water, and the controller controls an operating frequency of the first compressor, an operating frequency of the second compressor, and an operating frequency of the pump based on a temperature of the water flowing out from the water pipe.

Advantageous Effects of Invention

As described above, according to the embodiment of the present disclosure, the operating frequency of the compressor of the independent refrigerant circuit unit, the operating frequency of the pump of the free cooling unit, and the operating frequency of the compressor of the coupled refrigerant circuit unit are independently controlled. With such a configuration, even in the case where the refrigerant circuit and the free cooling circuit are operated simultaneously, it is possible to appropriately control the respective circuits.

DESCRIPTION OF EMBODIMENTS

Embodiment 1

Hereinafter, a cold water supply system according to Embodiment 1 of the present disclosure will be described. The cold water supply system according to Embodiment 1 produces cold water to be used in a cooling process at a factory or cold water to be used for cooling a data center, and supplies the cold water to an external cooling load.

[Configuration of Cold Water Supply System 1]

Figure 1:
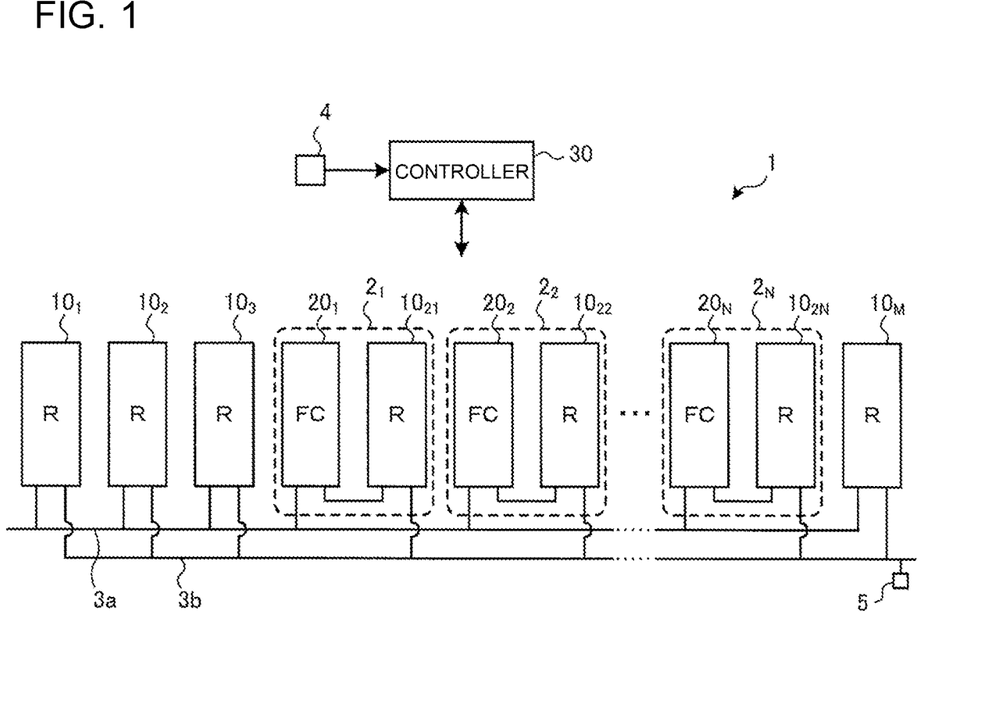
FIG. 1 is a schematic view showing one example of the configuration of a cold water supply system according to Embodiment 1.

FIG. 1 is a schematic view showing one example of the configuration of a cold water supply system 1 according to Embodiment 1. As shown in FIG. 1, the cold water supply system 1 includes one or a plurality of independent refrigerant circuit units $10_1, 10_2, \ldots, 10_M$, one or a plurality of composite units $2_1, 2_2, \ldots, 2_N$, and a controller 30. The independent refrigerant circuit units $10_1, 10_2, \ldots, 10_M$ and the composite units $2_1, 2_2, \ldots, 2_N$ are connected in parallel by water pipes 3a and 3b.

The composite unit $2_1, 2_2, \ldots, 2_N$ is formed such that a free cooling unit $20_1, 20_2, \ldots, 20_N$ and a coupled refrigerant circuit unit $10_{21}, 10_{22}, \ldots, 10_{2N}$ are connected with each other by the water pipes 3a and 3b. The free cooling unit $20_1, 20_2, \ldots, 20_N$ is disposed upstream of the coupled refrigerant circuit unit $10_{21}, 10_{22}, \ldots, 10_{2N}$ along the flow of water in the water pipes 3a and 3b, and the coupled refrigerant circuit unit $10_{21}, 10_{22}, \ldots, 10_{2N}$ is disposed downstream of the free cooling unit $20_1, 20_2, \ldots, 20_N$ along the flow of water in the water pipes 3a and 3b.

(Independent Refrigerant Circuit Unit $10_1, 10_2, \ldots, 10_M$)

Figure 2:
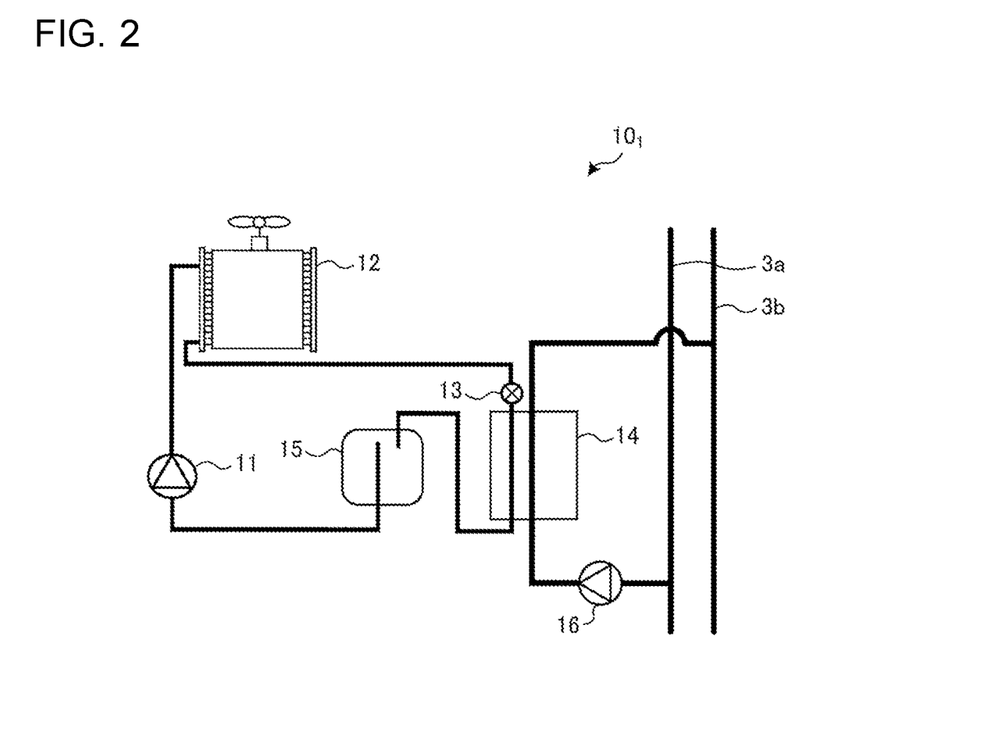
FIG. 2 is a schematic view showing one example of the configuration of an independent refrigerant circuit unit shown in FIG. 1.

The configuration of the independent refrigerant circuit unit $10_1, 10_2, \ldots, 10_M$ will be described. The respective independent refrigerant circuit units $10_1, 10_2, \ldots, 10_M$ have the same configuration and hence, hereinafter, the description will be made by taking the independent refrigerant circuit unit $10_1$ as an example. FIG. 2 is a schematic view showing one example of the configuration of the independent refrigerant circuit unit $10_1$ shown in FIG. 1. As shown in FIG. 2, the independent refrigerant circuit unit $10_1$ includes a compressor 11, an air heat exchanger 12, an expansion valve 13, a water heat exchanger 14, an accumulator 15, and a water feed pump 16. The compressor 11, the air heat exchanger 12, the expansion valve 13, the water heat exchanger 14 and the accumulator 15 are connected in sequence by refrigerant pipes, thus forming a refrigerant circuit.

The compressor 11 suctions refrigerant with low temperature and low pressure, compresses the suctioned refrigerant, and then discharges refrigerant with high temperature and high pressure. For example, the compressor 11 is an inverter compressor or other compressor where a capacity, which is a feeding amount per unit time, can be controlled by changing the operating frequency of the compressor 11. The operating frequency of the compressor 11 is controlled by the controller 30.

The air heat exchanger 12 exchanges heat between refrigerant and outdoor air supplied by an air-sending device or other device. The air heat exchanger 12 serves as a condenser that transfers heat of refrigerant to outdoor air to condense the refrigerant. The expansion valve 13 expands refrigerant that flows out from the air heat exchanger 12. For example, the expansion valve 13 is a valve whose opening degree can be controlled, such as an electronic expansion valve. The opening degree of the expansion valve 13 is controlled by the controller 30.

The water heat exchanger 14 exchanges heat between refrigerant flowing through a refrigerant flow passage and water flowing through a water flow passage. The water heat exchanger 14 serves as an evaporator that evaporates refrigerant to cool water flowing through the water flow passage by heat of vaporization generated when the refrigerant is evaporated. In an example shown in FIG. 2, refrigerant flowing through the refrigerant flow passage of the water heat exchanger 14 flows in a direction opposite to a direction along which water flows through the water flow passage. It is noted that the direction of refrigerant flowing through the refrigerant flow passage is not limited to the direction in such an example. For example, refrigerant flowing through the refrigerant flow passage may flow in a direction parallel to the direction along which water flows through the water flow passage.

The accumulator 15 is provided to the low-pressure side, which is the suction side, of the compressor 11. The accumulator 15 accumulates excess refrigerant such as excess refrigerant generated due to the difference in an operation state and excess refrigerant generated due to a transient change of operation. The water feed pump 16 is driven by a motor not shown in the drawing. The water feed pump 16 feeds and supplies water, flowing through the water pipe 3a, to the water flow passage of the water heat exchanger 14. The rotation speed of the water feed pump 16 is controlled by the controller 30.

(Composite Unit $2_1, 2_2, \ldots, 2_N$)

Figure 3:
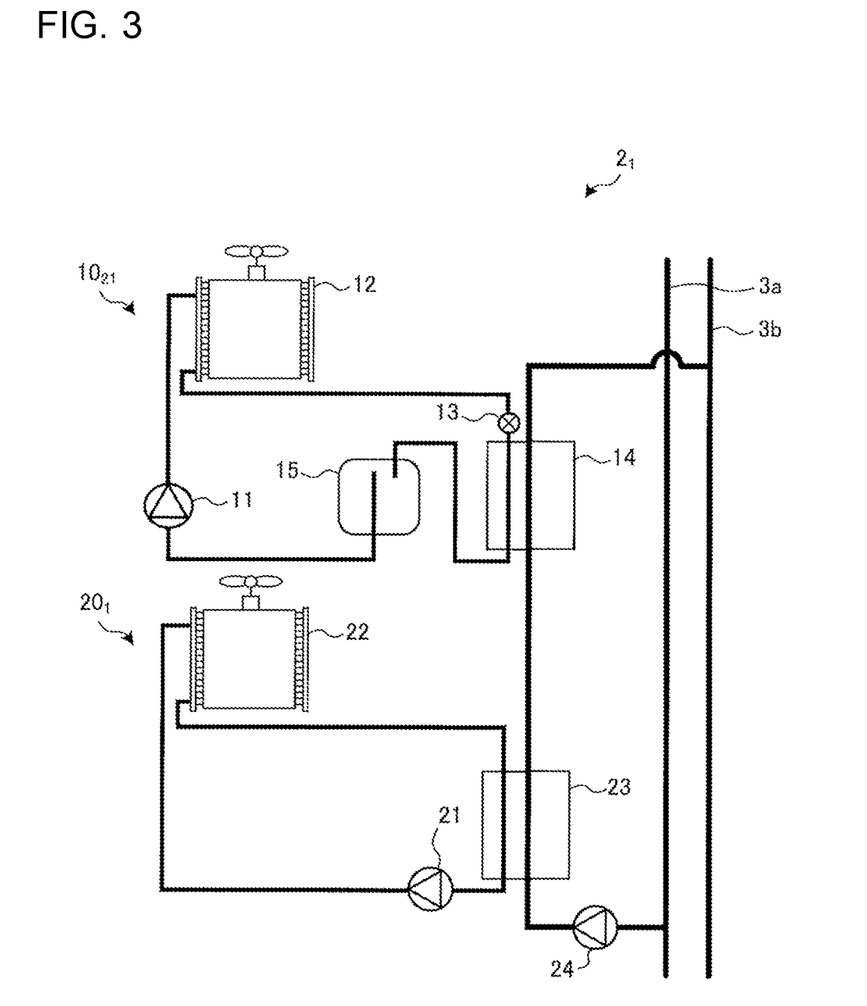
FIG. 3 is a schematic view showing one example of the configuration of a composite unit shown in FIG. 1.

The configuration of the composite unit $2_1, 2_2, \ldots, 2_N$ will be described. The respective composite units $2_1, 2_2, \ldots, 2_N$ have the same configuration and hence, hereinafter, the description will be made by taking the composite unit $2_1$ as an example. FIG. 3 is a schematic view showing one example of the configuration of the composite unit $2_1$ shown in FIG. 1. As shown in FIG. 3, the composite unit $2_1$ includes the free cooling unit $20_1$ and the coupled refrigerant circuit unit $10_{21}$. The configuration of the coupled refrigerant circuit unit $10_{21}$ is substantially equal to the configuration of the above-mentioned independent refrigerant circuit unit $10_1$ and hence, the description of the coupled refrigerant circuit unit $10_{21}$ will be omitted in the description made hereinafter.

The free cooling unit $20_1$ includes a brine pump 21, an air heat exchanger 22, a water heat exchanger 23, and a water feed pump 24. The brine pump 21, the air heat exchanger 22 and the water heat exchanger 23 are connected in sequence by pipes, thus forming a free cooling circuit through which a heat medium, such as water or brine, cycles.

The brine pump 21 is driven by a motor not shown in the drawing to feed a heat medium flowing through the free cooling circuit. The rotation speed of the brine pump 21 is controlled by the controller 30. The air heat exchanger 22 exchanges heat between the heat medium and outdoor air supplied by an air-sending device or other device. The air heat exchanger 22 transfers heat of the heat medium to outdoor air.

The water heat exchanger 23 exchanges heat between the heat medium flowing through a heat medium flow passage and water flowing through a water flow passage to cool water flowing through the water flow passage. In an example shown in FIG. 3, the heat medium flowing through the heat medium flow passage of the water heat exchanger 23 flows in a direction opposite to a direction along which water flows through the water flow passage. This is because when heat exchange is performed between a heat medium and water, a temperature difference between the heat medium and water is ensured, so that a high heat exchange rate can be achieved. The water feed pump 24 is driven by a motor not shown in the drawing. The water feed pump 24 feeds and supplies water, flowing through the water pipe 3a, to the water flow passage of the water heat exchanger 23. The rotation speed of the water feed pump 24 is controlled by the controller 30.

(Sensor)

The cold water supply system 1 shown in FIG. 1 also includes an outside air temperature sensor 4 and a water temperature sensor 5. The outside air temperature sensor 4 detects the temperature of outdoor air taken into the air heat exchangers 12 of the respective units and into the air heat exchangers 22 of the respective units. The water temperature sensor 5 detects the temperature of water flowing out from the water pipe 3b to be supplied to an external cooling load.

(Controller 30)

The controller 30 shown in FIG. 1 controls respective units of the cold water supply system 1. Particularly, in Embodiment 1, the controller 30 determines the number of units operated based on the operating frequencies of the compressors 11 in the independent refrigerant circuit units $10_1, 10_2, \ldots, 10_M$ and the operating frequencies of the brine pumps 21 in the composite units $2_1, 2_2, \ldots, 2_N$.

Figure 4:
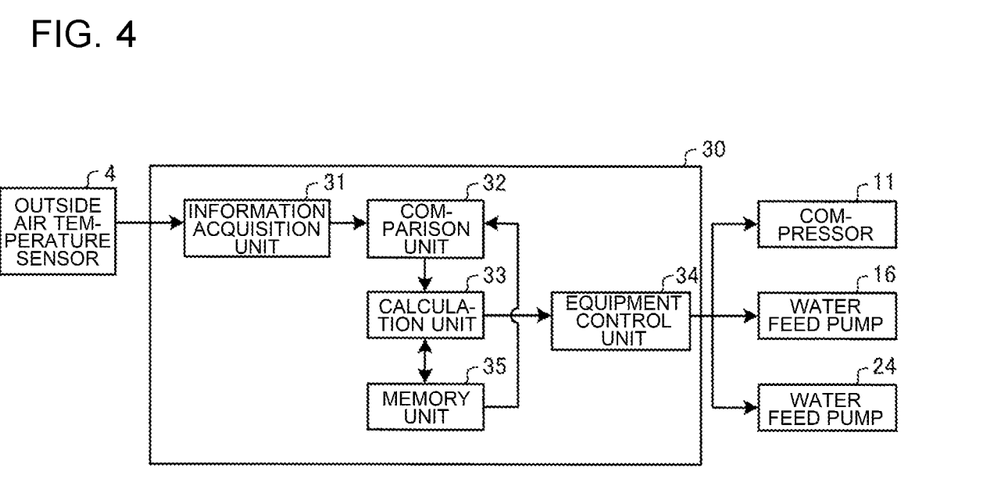
FIG. 4 is a function block diagram showing one example of the configuration of a controller shown in FIG. 1.

FIG. 4 is a function block diagram showing one example of the configuration of the controller 30 shown in FIG. 1. As shown in FIG. 4, the controller 30 includes an information acquisition unit 31, a comparison unit 32, a calculation unit 33, an equipment control unit 34, and a memory unit 35. The various functions of the controller 30 are implemented by executing software in an arithmetic unit, such as a microcomputer. Alternatively, the controller 30 is hardware or the like, such as a circuit device, that implements various functions.

The information acquisition unit 31 acquires information on outside air temperature detected by the outside air temperature sensor 4. The information acquisition unit 31 also acquires operation information indicative of the operation state of each unit. The operation information contains the operation state and the cumulative operating time of the unit, for example. The comparison unit 32 compares the information on the outside air temperature acquired by the information acquisition unit 31 with a target water temperature stored in the memory unit 35 and, based on a comparison result, determines a unit to be preferentially operated. The target water temperature is a target value of water to be supplied to an external cooling load.

The calculation unit 33 determines the number of respective units operated based on the operation information acquired by the information acquisition unit 31 and the comparison result from the comparison unit 32. The calculation unit 33 also confirms the number of respective units operated and, based on the confirmation result, determines a unit to be operated next. The equipment control unit 34 controls the operating frequencies of the compressors 11 and of the brine pumps 21 according to the processing result from the calculation unit 33.

The memory unit 35 stores various values used in the respective units of the controller 30. Specifically, the memory unit 35 stores in advance a target water temperature used in the comparison unit 32 and the threshold of the target water temperature. The memory unit 35 also stores in advance a threshold used in the calculation unit 33.

Figure 5:
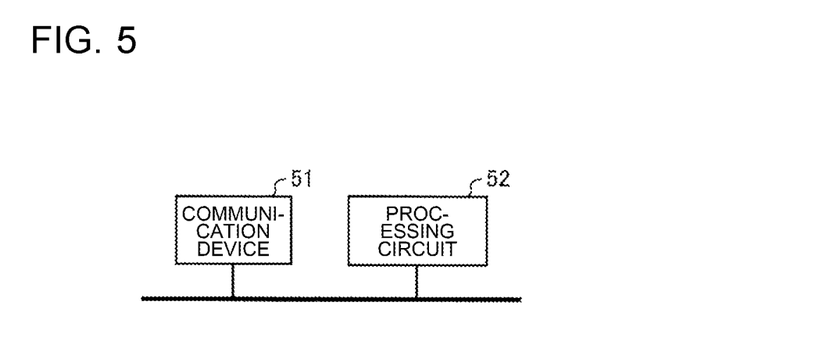
FIG. 5 is a hardware configuration diagram showing one example of the configuration of the controller shown in FIG. 4.

FIG. 5 is a hardware configuration diagram showing one example of the configuration of the controller 30 shown in FIG. 4. In the case where the various functions of the controller 30 are executed by hardware, as shown in FIG. 5, the controller 30 shown in FIG. 4 includes a communication device 51 and a processing circuit 52. The information acquisition unit 31 in FIG. 4 corresponds to the communication device 51 in FIG. 5. Further, the respective functions of the comparison unit 32, the calculation unit 33, the equipment control unit 34, and the memory unit 35 are implemented by the processing circuit 52.

In the case where the respective functions are executed by hardware, for example, the processing circuit 52 corresponds to a single circuit, a composite circuit, a programmed processor, a parallel programmed processor, an application specific integrated circuit (ASIC), a field-programmable gate array (FPGA), or the combination of these. Each of the respective functions of the comparison unit 32, the calculation unit 33, the equipment control unit 34 and the memory unit 35 may be implemented by the processing circuit 52, or the functions of the respective units may be implemented by the processing circuit 52.

Figure 6:
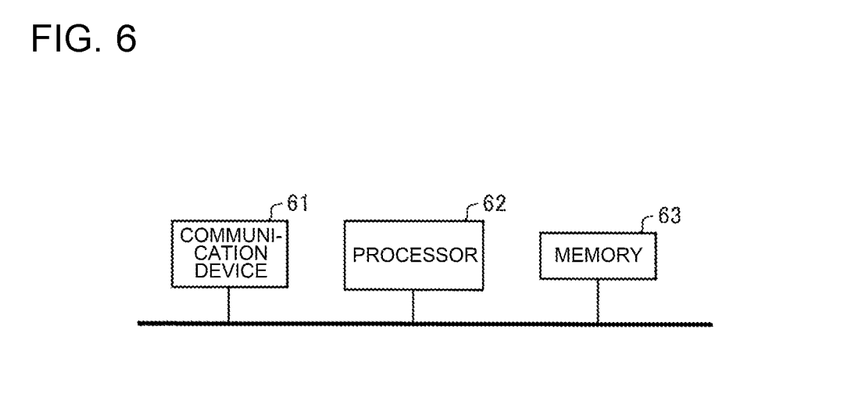
FIG. 6 is a hardware configuration diagram showing another example of the configuration of the controller shown in FIG. 4.

FIG. 6 is a hardware configuration diagram showing another example of the configuration of the controller 30 shown in FIG. 4. In the case where the various functions of the controller 30 are executed by software, as shown in FIG. 6, the controller 30 shown in FIG. 4 includes a communication device 61, a processor 62, and a memory 63. The information acquisition unit 31 in FIG. 4 corresponds to the communication device 61 in FIG. 6. Further, the respective functions of the comparison unit 32, the calculation unit 33, the equipment control unit 34, and the memory unit 35 are implemented by the processor 62 and the memory 63.

In the case where the respective functions are executed by software, the functions of the comparison unit 32, the calculation unit 33 and the equipment control unit 34 are implemented by software, firmware, or the combination of the software and the firmware. The software or the firmware is described as a program, and is stored in the memory 63. The memory unit 35 in FIG. 4 corresponds to the memory 63 in FIG. 6. The processor 62 reads and executes the program stored in the memory 63 to implement the functions of the respective units.

As the memory 63, for example, a nonvolatile or volatile semiconductor memory is used, such as a random access memory (RAM), a read only memory (ROM), a flash memory, an erasable and programmable ROM (EPROM) or an electrically erasable and programmable ROM (EEPROM). Further, as the memory 63, for example, a detachable recording medium may be used, such as a magnetic disk, a flexible disk, an optical disc, a compact disc (CD), a mini disc (MD) or a digital versatile disc (DVD).

[Manner of Operation of Cold Water Supply System 1]

The manner of operation of the cold water supply system 1 having the above-mentioned configuration will be described. The cold water supply system 1 according to Embodiment 1 performs a unit number control that determines the number of units to be operated such that the temperature of water to be supplied to an external cooling load assumes a target water temperature.

Further, the cold water supply system 1 controls, according to the relationship between the target water temperature and an outside air temperature, the operations of and the number of independent refrigerant circuit units $10_1, 10_2, \ldots, 10_M$ operated at that time and the operations of and the number of composite units $2_1, 2_2, \ldots, 2_N$ operated at that time. Specifically, the cold water supply system 1 performs a free cooling unit preference number control and a refrigerant circuit unit preference number control according to the relationship between the target water temperature and the outside air temperature.

(Unit Number Control of Units)

First, a unit number control performed for the independent refrigerant circuit units $10_1, 10_2, \ldots, 10_M$ and the composite units $2_1, 2_2, \ldots, 2_N$ will be schematically described. When the independent refrigerant circuit units $10_1, 10_2, \ldots, 10_M$ are operated, an operating frequency of the compressor 11 exists at which the coefficient of performance (COP) reaches a maximum within the range of the operating frequencies lower than the maximum value of the operating frequency. When the composite units $2_1, 2_2, \ldots, 2_N$ are operated, an operating frequency of the brine pump 21 exists at which the coefficient of performance (COP) reaches a maximum within the range of the operating frequencies lower than the maximum value of the operating frequency. Therefore, for example, in the case where a total operating frequency when a certain number of units are operated is equal to a total operating frequency when the certain number of units and one added unit are operated, the COP in the case where the certain number of units and one added unit are operated may be higher than the COP in the case where the certain number of units are operated.

In view of the above, in Embodiment 1, the number of units to be operated is controlled based on the operating frequencies of the compressors $11$ or of the brine pumps $21$ such that the entire system can achieve the maximum efficiency.

(Free Cooling Unit Preference Number Control)

The free cooling unit preference number control (hereinafter referred to as "FC preference number control") will be described. The FC preference number control is a control that causes the free cooling units $20_1$, $20_2$, ..., $20_N$ of the composite units $2_1$, $2_2$, ..., $2_N$ to be preferentially operated when the above-mentioned unit number control is performed. The FC preference number control is performed when an outside air temperature is lower than a target water temperature. This is because it is possible to efficiently cool water flowing through the water pipe $3a$ by effectively utilizing heat of outside air.

In the FC preference number control, first, the equipment control unit $34$ of the controller $30$ operates the free cooling units $20_1$, $20_2$, ..., $20_N$ of the composite units $2_1$, $2_2$, ..., $2_N$. At this point of operation, the calculation unit $33$ calculates the total load of the free cooling units $20_1$, $20_2$, ..., $20_N$ to be operated and, based on the calculated total load, determines the number of units operated to be such that the free cooling units $20_1$, $20_2$, ..., $20_N$ as a whole can achieve the maximum efficiency. The total load of the free cooling units $20_1$, $20_2$, ..., $20_N$ can be obtained by multiplying a load per one unit calculated from the operating frequency of the brine pump $21$ by the number of units operated.

The number of free cooling units $20_1$, $20_2$, ..., $20_N$ operated is not limited to the number in this example, and may be determined based on the operating frequencies of the brine pumps $21$, for example. Specifically, when the operating frequencies of the free cooling units $20_1$, $20_2$, ..., $20_N$ in operation become equal to or more than a threshold set in advance, the calculation unit $33$ may increase the number of units operated by one. The threshold at this point of operation is set to a value close to the maximum operating frequency of the brine pump $21$ and smaller than the maximum operating frequency, for example. More specifically, in the case where the maximum operating frequency of the brine pump $21$ is 60 Hz, the threshold is set to approximately 50 Hz to 55 Hz.

Next, in the case where all of the free cooling units $20_1$, $20_2$, ..., $20_N$ are in operation, and the temperature of water flowing through the water pipe $3b$ does not reach the target water temperature, the equipment control unit $34$ operates the coupled refrigerant circuit units $10_{21}$, $10_{22}$, ..., $10_{2N}$ of the composite units $2_1$, $2_2$, ..., $2_N$, the coupled refrigerant circuit units $10_{21}$, $10_{22}$, ..., $10_{2N}$ being respectively coupled with the free cooling units $20_1$, $20_2$, ..., $20_N$. This is because the water feed pumps $24$ of the free cooling units $20_1$, $20_2$, ..., $20_N$ in operation are already driven, so that such operation is more efficient compared with the case where the water feed pumps $16$ of the independent refrigerant circuit units $10_1$, $10_2$, ..., $10_M$ are newly driven.

The number of coupled refrigerant circuit units $10_{21}$, $10_{22}$, ..., $10_{2N}$ operated at this time is determined based on the operating frequencies of the compressors $11$ of the respective units, for example. Specifically, the information acquisition unit $31$ acquires operation information indicative of the operating frequency of the compressor $11$ from each of the coupled refrigerant circuit units $10_{21}$, $10_{22}$, ..., $10_{2N}$. The calculation unit $33$ sums the acquired operating frequencies of respective units. When the obtained total operating frequency exceeds a boundary frequency set in advance, the calculation unit $33$ increases the number of units to be operated. Of the coupled refrigerant circuit units $10_{21}$, $10_{22}$, ..., $10_{2N}$, a unit is determined as the unit to be operated in ascending order of cumulative operating time.

Next, in the case where all of the free cooling units $20_1$, $20_2$, ..., $20_N$ and all of the coupled refrigerant circuit units $10_{21}$, $10_{22}$, ..., $10_{2N}$ are in operation, and the temperature of water flowing through the water pipe $3b$ does not reach the target water temperature, the equipment control unit $34$ operates the independent refrigerant circuit units $10_1$, $10_2$, ..., $10_M$. The number of independent refrigerant circuit units $10_1$, $10_2$, ..., $10_M$ operated at this time is determined in the same manner as the case of determining the number of coupled refrigerant circuit units $10_{21}$, $10_{22}$, ..., $10_{2N}$ operated. Of the independent refrigerant circuit units $10_1$, $10_2$, ..., $10_M$, a unit is determined as the unit to be operated in ascending order of cumulative operating time.

Figure 7:
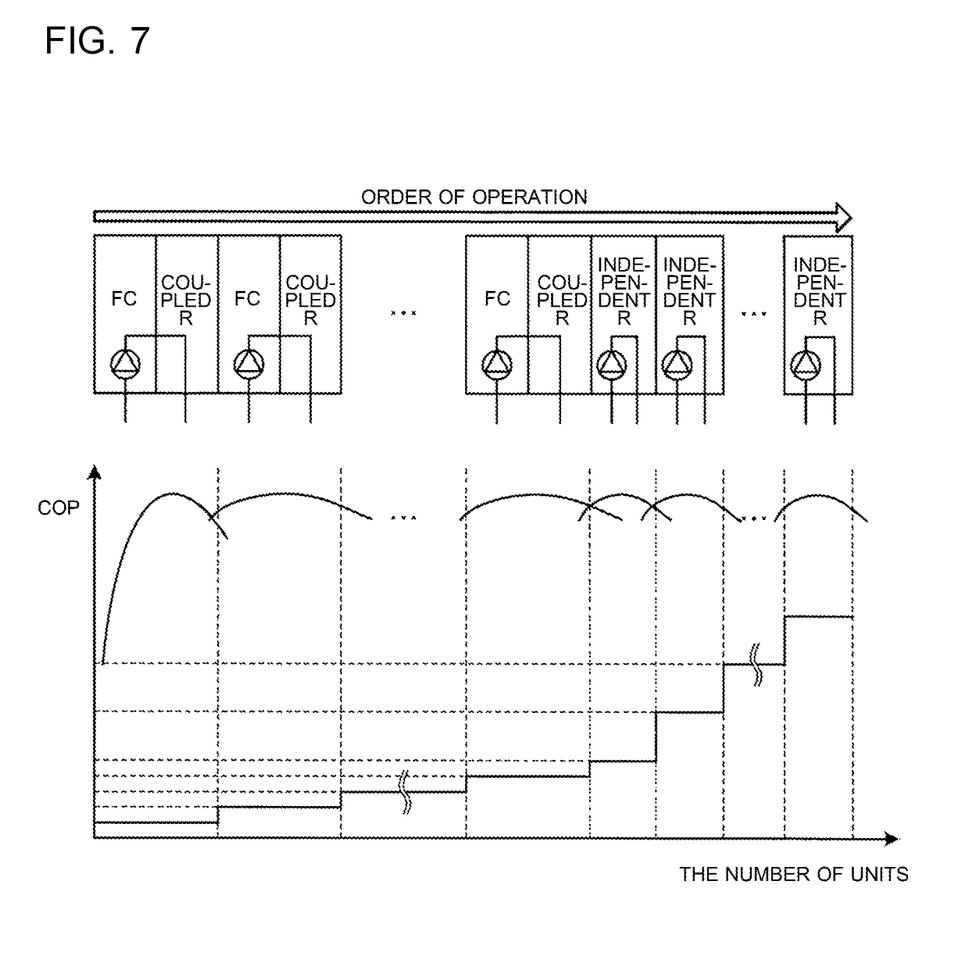
FIG. 7 is a schematic view for describing the relationship between the number of units operated and the COP when a free cooling unit preference number control is performed.

FIG. 7 is a schematic view for describing the relationship between the number of units operated and the COP when the free cooling unit preference number control is performed. In FIG. 7, the number of units to be operated is shown on the horizontal axis, and the COP is shown on the vertical axis.

As shown in FIG. 7, the controller $30$ operates the respective units in order of the free cooling unit $20_1$, $20_2$, ..., $20_N$, the coupled refrigerant circuit unit $10_{21}$, $10_{22}$, ..., $10_{2N}$ and the independent refrigerant circuit unit $10_1$, $10_2$, ..., $10_M$. With such a configuration, it is possible to cool water while a high COP is maintained at the time of performing the free cooling unit preference number control.

(Refrigerant Circuit Unit Preference Number Control)

The refrigerant circuit unit preference number control (hereinafter referred to as "R preference number control") will be described. The R preference number control is a control that causes the independently provided independent refrigerant circuit units $10_1$, $10_2$, ..., $10_M$ to be preferentially operated when the above-mentioned unit number control is performed. The R preference number control is performed when an outside air temperature is equal to or higher than the target water temperature. This is because since the outside air temperature is equal to or higher than the target water temperature, it is impossible to cool water by the free cooling units $20_1$, $20_2$, ..., $20_N$ of the composite units $2_1$, $2_2$, ..., $2_N$. Therefore, in the R preference number control, the operations of the free cooling units $20_1$, $20_2$, ..., $20_N$ are stopped.

In the R preference number control, the equipment control unit $34$, first, operates the independent refrigerant circuit units $10_1$, $10_2$, ..., $10_M$. The number of independent refrigerant circuit units $10_1$, $10_2$, ..., $10_M$ operated at this time is determined based on the operating frequencies of the compressors $11$ of the respective units, for example. Specifically, the information acquisition unit $31$ acquires operation information indicative of the operating frequency of the compressor $11$ from each of the independent refrigerant circuit units $10_1$, $10_2$, ..., $10_M$. The calculation unit $33$ sums the acquired operating frequencies of the respective units. When the obtained total operating frequency exceeds a boundary frequency set in advance, the calculation unit 33 increases the number of units to be operated. Of the independent refrigerant circuit units $10_1, 10_2, \ldots, 10_M$, a unit is determined as the unit to be operated in ascending order of cumulative operating time.

Next, in the case where all of the independent refrigerant circuit units $10_1, 10_2, \ldots, 10_M$ are in operation, and the temperature of water flowing through the water pipe 3b does not reach the target water temperature, the equipment control unit 34 operates the coupled refrigerant circuit units $10_{21}, 10_{22}, \ldots, 10_{2N}$ coupled to the free cooling units $20_1, 20_2, \ldots, 20_N$. The number of coupled refrigerant circuit units $10_{21}, 10_{22}, \ldots, 10_{2N}$ operated at this time is determined in the same manner as the case of determining the number of independent refrigerant circuit units $10_1, 10_2, \ldots, 10_M$ operated. Of the coupled refrigerant circuit units $10_{21}, 10_{22}, \ldots, 10_{2N}$, a unit is determined as the unit to be operated in ascending order of cumulative operating time.

Figure 8:
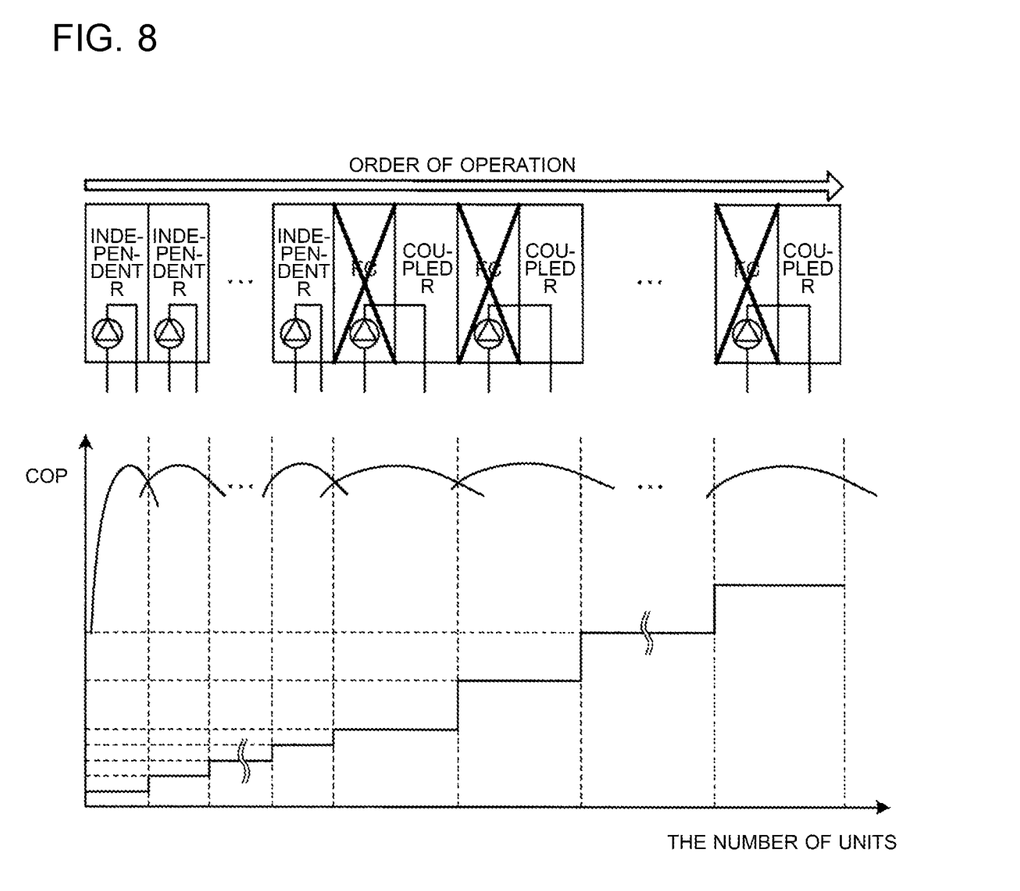
FIG. 8 is a schematic view for describing the relationship between the number of units operated and the COP when a refrigerant circuit unit preference number control is performed.

FIG. 8 is a schematic view for describing the relationship between the number of units operated and the COP when the refrigerant circuit unit preference number control is performed. In FIG. 8, the number of units to be operated is shown on the horizontal axis, and the COP is shown on the vertical axis.

As shown in FIG. 8, the controller 30 operates the respective units in order of the independent refrigerant circuit units $10_1, 10_2, \ldots, 10_M$ and the coupled refrigerant circuit units $10_{21}, 10_{22}, \ldots, 10_{2N}$. With such a configuration, it is possible to cool water while a high COP is maintained at the time of performing the refrigerant circuit unit preference number control.

(Unit Number Control Process)

Figure 9:
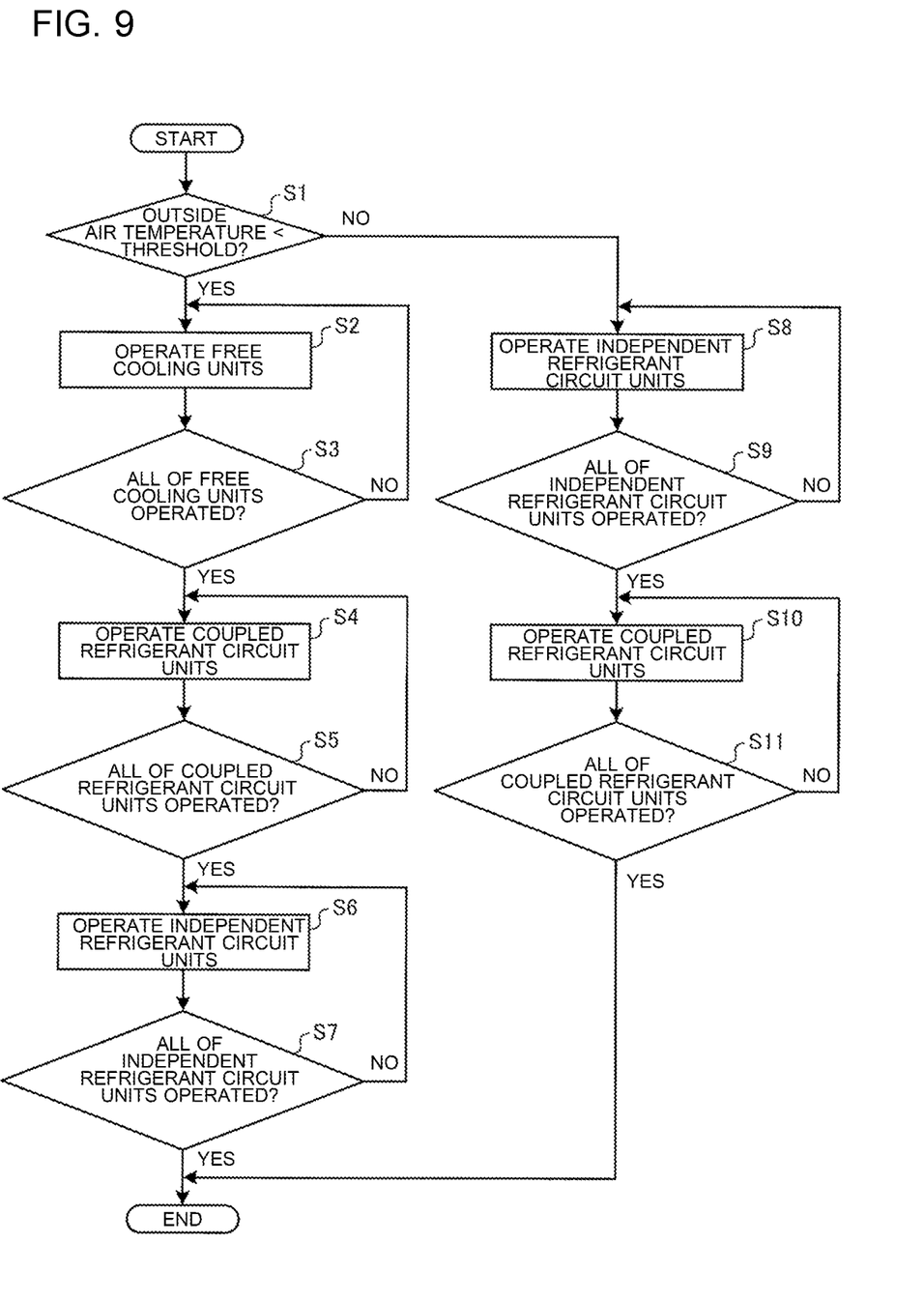
FIG. 9 is a flowchart showing one example of the flow of a unit number control process performed by the cold water supply system shown in FIG. 1.

FIG. 9 is a flowchart showing one example of the flow of the unit number control process performed by the cold water supply system 1 shown in FIG. 1. In step S1, the comparison unit 32 compares outside air temperature detected by the outside air temperature sensor 4 with the threshold stored in the memory unit 35 to determine whether or not the outside air temperature is lower than the threshold. This threshold is set in advance based on a target water temperature. For example, the target water temperature itself may be set as the threshold, or a value lower than the target water temperature may be set as the threshold.

When the outside air temperature is lower than the threshold (step S1; Yes), the processing advances to step S2 where the free cooling unit preference number control is performed. In step S2, the equipment control unit 34 operates the free cooling units $20_1, 20_2, \ldots, 20_N$. At this point of operation, the calculation unit 33 determines the number of free cooling units $20_1, 20_2, \ldots, 20_N$ to be operated based on the total load of the free cooling units $20_1, 20_2, \ldots, 20_N$ to be operated such that the free cooling units $20_1, 20_2, \ldots, 20_N$ as a whole can achieve the maximum efficiency.

In step S3, the calculation unit 33 determines whether or not all of the free cooling units $20_1, 20_2, \ldots, 20_N$ are operated. When all of the free cooling units $20_1, 20_2, \ldots, 20_N$ are in operation (step S3; Yes), the processing advances to step S4. When all of the free cooling units $20_1, 20_2, \ldots, 20_N$ are not in operation (step S3; No), the processing returns to step S2.

In step S4, the equipment control unit 34 operates the coupled refrigerant circuit units $10_{21}, 10_{22}, \ldots, 10_{2N}$. At this point of operation, the controller 30 determines the number of units operated based on the operating frequencies of the compressors 11 of the respective units.

In step S5, the calculation unit 33 determines whether or not all of the coupled refrigerant circuit units $10_{21}, 10_{22}, \ldots, 10_{2N}$ are operated. When all of the coupled refrigerant circuit units $10_{21}, 10_{22}, \ldots, 10_{2N}$ are in operation (step S5; Yes), the processing advances to step S6. When all of the coupled refrigerant circuit units $10_{21}, 10_{22}, \ldots, 10_{2N}$ are not in operation (step S5; No), the processing returns to step S4.

In step S6, the equipment control unit 34 operates the independent refrigerant circuit units $10_1, 10_2, \ldots, 10_M$. At this point of operation, the controller 30 determines the number of units operated based on the operating frequencies of the compressors 11 of the respective units.

In step S7, the calculation unit 33 determines whether or not all of the independent refrigerant circuit units $10_1, 10_2, \ldots, 10_M$ are operated. When all of the independent refrigerant circuit units $10_1, 10_2, \ldots, 10_M$ are in operation (step S7; Yes), the series of processing steps is finished, and the current operation state of each unit is maintained. When all of the independent refrigerant circuit units $10_1, 10_2, \ldots, 10_M$ are not in operation (step S7; No), the processing returns to step S6.

Whereas when the outside air temperature is equal to or more than the threshold in step S1 (step S1; No), the processing advances to step S8 where the refrigerant circuit unit preference number control is performed. In step S8, the equipment control unit 34 operates the independent refrigerant circuit units $10_1, 10_2, \ldots, 10_M$. At this point of operation, the controller 30 determines the number of units operated based on the operating frequencies of the compressors 11 of the respective units in the same manner as step S6.

In step S9, the calculation unit 33 determines whether or not all of the independent refrigerant circuit units $10_1, 10_2, \ldots, 10_M$ are operated. When all of the independent refrigerant circuit units $10_1, 10_2, \ldots, 10_M$ are in operation (step S9; Yes), the processing advances to step S10. When all of the independent refrigerant circuit units $10_1, 10_2, \ldots, 10_M$ are not in operation (step S9; No), the processing returns to step S8.

In step S10, the equipment control unit 34 operates the coupled refrigerant circuit units $10_{21}, 10_{22}, \ldots, 10_{2N}$. At this point of operation, the controller 30 determines the number of units operated based on the operating frequencies of the compressors 11 of the respective units in the same manner as step S4.

In step S11, the calculation unit 33 determines whether or not all of the coupled refrigerant circuit units $10_{21}, 10_{22}, \ldots, 10_{2N}$ are operated. When all of the coupled refrigerant circuit units $10_{21}, 10_{22}, \ldots, 10_{2N}$ are in operation (step S11; Yes), the series of processing steps is finished, and the current operation state of each unit is maintained. When all of the coupled refrigerant circuit units $10_{21}, 10_{22}, \ldots, 10_{2N}$ are not in operation (step S11; No), the processing returns to step S10.

As described above, in the cold water supply system 1 according to Embodiment 1, the operating frequencies of the compressors 11 of the independent refrigerant circuit units $10_1, 10_2, \ldots, 10_M$, the operating frequencies of the brine pumps 21 of the free cooling units $20_1, 20_2, \ldots, 20_N$, and the operating frequencies of the compressors 11 of the coupled refrigerant circuit units $10_{21}, 10_{22}, \ldots, 10_{2N}$ are controlled. With such a control, the respective units are independently controlled. Accordingly, even in the case where the refrigerant circuit and the free cooling circuit are operated simultaneously, it is possible to appropriately control the respective circuits.

In the cold water supply system 1, the free cooling unit $20_1, 20_2, \ldots, 20_N$ is disposed upstream of the coupled refrigerant circuit unit $10_{21}, 10_{22}, \ldots, 10_{2N}$ along a flow direction of water flowing through the water pipe 3a. The free cooling unit $20_1, 20_2, \ldots, 20_N$ can cool water flowing through the water pipe 3a by merely driving the brine pump 21. In other words, the free cooling unit $20_1, 20_2, \ldots, 20_N$ has extremely high efficiency when cooling water. Therefore, with the provision of the free cooling unit $20_1, 20_2, \ldots, 20_N$ upstream of the coupled refrigerant circuit unit $10_{21}, 10_{22}, \ldots, 10_{2N}$, it is possible to efficiently cool water flowing through the water pipe 3a.

In the cold water supply system 1, when an outside air temperature is lower than the threshold based on the target water temperature, the free cooling units $20_1, 20_2, \ldots, 20_N$ are preferentially operated. With such a configuration, it is possible to efficiently cool water flowing through the water pipe 3a.

The number of free cooling units $20_1, 20_2, \ldots, 20_N$ operated at this time is determined based on the total load of the units in operation. However, the number of free cooling units $20_1, 20_2, \ldots, 20_N$ operated at this time is not limited to the above, and may be determined based on the operating frequencies of the brine pumps 21 of the units in operation.

In the cold water supply system 1, in the case where all of the free cooling units $20_1, 20_2, \ldots, 20_N$ are in operation, and a water temperature has not reached the target water temperature, the coupled refrigerant circuit units $10_{21}, 10_{22}, \ldots, 10_{2N}$ are operated. Further, in the case where all of the coupled refrigerant circuit units $10_{21}, 10_{22}, \ldots, 10_{2N}$ are in operation, and a water temperature is lower than the target water temperature, the independent refrigerant circuit units $10_1, 10_2, \ldots, 10_M$ are operated. With such a configuration, it is possible to efficiently cool water flowing through the water pipe 3a.

The number of coupled refrigerant circuit units $10_{21}, 10_{22}, \ldots, 10_{2N}$ operated at this time and the number of independent refrigerant circuit units $10_1, 10_2, \ldots, 10_M$ operated at this time are determined based on the operating frequencies of the compressors of the units in operation.

Assume the case of increasing the number of units to be operated in the cold water supply system 1. In such a case, of the respective units, a unit is caused to be operated in ascending order of cumulative operating time. With such a configuration, the operating times of the respective units can be made uniform.

In the cold water supply system 1, when the outside air temperature equal to or more than the threshold based on the target water temperature, the independent refrigerant circuit units $10_1, 10_2, \ldots, 10_M$ are preferentially operated. With such a configuration, it is possible to efficiently cool water flowing through the water pipe 3a. The number of independent refrigerant circuit units $10_1, 10_2, \ldots, 10_M$ operated at this time is determined based on the operating frequencies of the compressors 11 of the independent refrigerant circuit units $10_1, 10_2, \ldots, 10_M$ in operation.

In the cold water supply system 1, in the case where all of the independent refrigerant circuit units $10_1, 10_2, \ldots, 10_M$ are in operation, and the water temperature has not reached the target water temperature, the coupled refrigerant circuit units $10_{21}, 10_{22}, \ldots, 10_{2N}$ are operated. With such a configuration, it is possible to efficiently cool water flowing through the water pipe 3a.

REFERENCE SIGNS LIST 1 cold water supply system, $2_1, 2_2, \ldots, 2_N$ composite unit, 3a, 3b water pipe, 4 outside air temperature sensor, 5 water temperature sensor, $10_1, 10_2, \ldots, 10_M$ independent refrigerant circuit unit, $10_{21}, 10_{22}, \ldots, 10_{2N}$ coupled refrigerant circuit unit, 11 compressor, 12 air heat exchanger, 13 expansion valve, 14 water heat exchanger, accumulator, 16 water feed pump, $20_1, 20_2, \ldots, 20_N$ free cooling unit, 21 brine pump, 22 air heat exchanger, 23 water heat exchanger, 24 water feed pump, 30 controller, 31 information acquisition unit, 32 comparison unit, 33 calculation unit, 34 equipment control unit, 35 memory unit, 51 communication device, 52 processing circuit, 61 communication device, 62 processor, 63 memory.

The invention claimed is:

1. A cold water supply system that cools water flowing through a water pipe, and supplies the cooled water to a cooling load, the cold water supply system comprising:
   at least one independent refrigerant circuit unit including a first compressor and a first water heat exchanger configured to exchange heat between refrigerant flowing in the first water heat exchanger and the water flowing through the water pipe to cool the water;
   at least one composite unit configured to cool the water flowing through the water pipe; and
   a controller configured to control operation of the independent refrigerant circuit unit and operation of the composite unit, wherein
   the composite unit includes
      a free cooling unit including a pump and a second water heat exchanger configured to exchange heat between a heat medium and the water to cool the water, and
      a coupled refrigerant circuit unit connected in series with the free cooling unit and including a second compressor and a third water heat exchanger configured to exchange heat between refrigerant flowing in the third water heat exchanger and the water to cool the water, and
   the controller controls an operating frequency of the first compressor, an operating frequency of the second compressor, and an operating frequency of the pump based on a temperature of the water flowing out from the water pipe.

2. The cold water supply system of claim 1, wherein
the free cooling unit is disposed upstream of the coupled refrigerant circuit unit along a flow direction of the water flowing through the water pipe.

3. The cold water supply system of claim 1, further comprising
an outside air temperature sensor configured to detect an outside air temperature, wherein
the controller is configured to
   store a target water temperature of the water flowing out from the water pipe,
   set a threshold based on the target water temperature,
   compare the outside air temperature with the threshold to determine, based on a comparison result, a unit to be operated from among the independent refrigerant circuit unit, the free cooling unit, and the coupled refrigerant circuit unit, and
   calculate a number of the units determined to be operated.

4. The cold water supply system of claim 3, wherein
the controller is configured to preferentially operate the free cooling unit in a case where the outside air temperature is lower than the threshold.

5. The cold water supply system of claim 4, wherein
the controller determines a number of the operated free cooling units based on a total load of the free cooling unit in operation.

6. The cold water supply system of claim 4, wherein
the controller determines a number of the operated free cooling units based on an operating frequency of the pump of the free cooling unit in operation.

7. The cold water supply system of claim 4, wherein
the controller
  operates the coupled refrigerant circuit unit in a case where all of the free cooling units are in operation, and a temperature of the water flowing out from the water pipe has not reached the target water temperature, and
  operates the independent refrigerant circuit unit in a case where all of the free cooling units and all of the coupled refrigerant circuit units are in operation, and the temperature of the water flowing out from the water pipe has not reached the target water temperature.

8. The cold water supply system of claim 7, wherein
the controller determines a number of the operated coupled refrigerant circuit units operated and a number of the independent refrigerant circuit units operated based on an operating frequency of the second compressor of the coupled refrigerant circuit unit in operation and an operating frequency of the first compressor of the independent refrigerant circuit unit in operation.

9. The cold water supply system of claim 8, wherein
in increasing the number of the coupled refrigerant circuit units operated or the number of the independent refrigerant circuit units operated, the controller causes the coupled refrigerant circuit unit or the independent refrigerant circuit unit to be operated in an ascending order of cumulative operating time.

10. The cold water supply system of claim 3, wherein
the controller determines to preferentially operate the independent refrigerant circuit unit in a case where the outside air temperature is equal to or more than the threshold.

11. The cold water supply system of claim 10, wherein
the controller determines a number of the independent refrigerant circuit units operated based on an operating frequency of the first compressor of the independent refrigerant circuit unit in operation.

12. The cold water supply system of claim 10, wherein
the controller operates the coupled refrigerant circuit unit in a case where all of the independent refrigerant circuit units are in operation, and a temperature of the water flowing out from the water pipe has not reached the target water temperature.

13. The cold water supply system of claim 10, wherein
in increasing the number of the independent refrigerant circuit units operated or a number of the coupled refrigerant circuit units operated, the calculation unit causes the independent refrigerant circuit unit or the coupled refrigerant circuit unit to be operated in an ascending order of cumulative operating time.

* * * * *